United States Patent [19]
Giebmanns

[11] Patent Number: 5,738,572
[45] Date of Patent: Apr. 14, 1998

[54] GRINDING MACHINE

[76] Inventor: Karl-Heinz Giebmanns, 10 Cedardale Ct., Palm Coast, Fla. 32137

[21] Appl. No.: 634,799

[22] Filed: Apr. 19, 1996

[30] Foreign Application Priority Data

Apr. 19, 1995 [DE] Germany .................. 195 14 390.6

[51] Int. Cl.⁶ ...................................... B24B 3/00
[52] U.S. Cl. .............. 451/221; 451/49; 451/10; 451/12
[58] Field of Search ................ 451/49, 51, 119, 451/120, 232, 394, 320, 272, 162, 455, 451, 452, 221, 10, 11, 12, 242, 246

[56] References Cited

U.S. PATENT DOCUMENTS

| | | | |
|---|---|---|---|
| 3,616,576 | 11/1971 | Piat | 451/221 |
| 4,274,229 | 6/1981 | Favrot | 451/221 |
| 4,330,962 | 5/1982 | Favrot | 451/221 |
| 4,617,764 | 10/1986 | Reibakh | 451/11 |
| 4,631,869 | 12/1986 | Miyatake et al. | 451/11 |

FOREIGN PATENT DOCUMENTS

| | | |
|---|---|---|
| 8419190 | 2/1986 | Germany . |
| 3523013 | 1/1987 | Germany . |

*Primary Examiner*—James G. Smith
*Assistant Examiner*—Derris H. Banks
*Attorney, Agent, or Firm*—Robert W. Becker & Associates

[57] ABSTRACT

A grinding machine has a machine frame and a grinding spindle support positioned on the machine frame. At least one grinding spindle is arranged with upwardly slanted axis at the grinding spindle support. A grinding wheel is connected to the grinding spindle. A workpiece holder is connected to the machine frame so as to extend parallel to the axis of the grinding spindle. The workpiece holder is displaceable in the axial direction of the grinding spindle and perpendicular to the axial direction of the grinding spindle. A housing is positioned at a slant parallel to the axis of the grinding spindle and encloses the workpiece holder and the grinding wheel. The housing has an outlet opening for a cooling liquid at the lowermost point of the housing. Drive devices for effecting a linear movement of the workpiece holder and a rotational movement of the grinding wheel and the workpiece are positioned exterior to the housing.

12 Claims, 10 Drawing Sheets

GRINDING MACHINE

BACKGROUND OF THE INVENTION

The present invention relates to a grinding machine with at least one grinding spindle arranged on a grinding spindle support as well as with a workpiece holder displaceable parallel to the axis of the grinding spindle approximately in the axial direction of the grinding spindle and also perpendicular thereto.

For such grinding machines the workpiece holder, in general, is arranged on a horizontal elongate tabletop and is displaceable along the tabletop in the axial direction of the grinding spindle while the elongate tabletop itself is displaceable transverse to the axial direction of the grinding spindle, or vice versa.

For driving the workpiece holder in a linear movement and for rotating the grinding wheel and optionally a workpiece, hydraulic drives or electric motors are provided. For cooling the workpiece during grinding and for improving the surface quality, a cooling liquid is introduced into the area between the workpiece and the grinding wheel which, in general, is cooling water, optionally containing corrosion-reducing additives, or a cooling oil. In addition to the desired cooling effect, the cooling liquid also serves to remove the grinding dust from the working area.

In conventional grinding machines with horizontal elongate tabletop, this grinding dust collects on the tabletop in the area of the guides for the workpiece holder, forms hard deposits, and thus impairs the precision of the workpiece machining. This grinding dust can also reach the area of the linear and rotational drives and can also cause problems in this area. Furthermore, the grinding machine with a horizontal elongate tabletop requires a large amount of space.

It is therefore an object of the present invention to provide a grinding machine having only a minimal space requirement and in which the grinding dust does not collect in the area of the glide guiding means and of the drive units. In addition, it is desired to design the grinding machine such that the grinding wheel, in any adjusted position, can be trimmed precisely, whereby the trimming device should be displaceable only uniaxially.

SUMMARY OF THE INVENTION

The grinding machine of the present invention is primarily characterized by:

A machine frame;

A grinding spindle support positioned on the machine frame;

At least one grinding spindle arranged with upwardly slanted axis at the grinding spindle support;

A grinding wheel connected to the grinding spindle;

A workpiece holder connected to the machine frame so as to extend parallel to the axis of the grinding spindle;

The workpiece holder displaceable in the axial direction of the grinding spindle and perpendicular to the axial direction of the grinding spindle;

A housing positioned at a slant parallel to the axis of the grinding spindle and enclosing the workpiece holder and the grinding wheel;

The housing having an outlet opening for cooling liquid at a lowermost point of the housing;

Drive means, for effecting a linear movement of the workpiece holder and a rotational movement of the grinding wheel and the workpiece, positioned exterior to the housing.

Advantageously, the workpiece holder is positioned at a slant angle of approximately 30° relative to the horizontal.

Preferably, the grinding machine further comprises an elongate tabletop comprising first guide rails, extending perpendicular to the axial direction of the grinding spindle and connected to the machine frame, and first glide shoes slidably connected to the guide rails for displacing the elongate tabletop relative to the machine frame;

A funnel-shaped receiving element for catching the cooling liquid connected to the machine frame;

Wherein the workpiece holder comprises second guide rails extending in the axial direction of the grinding spindle and second glide shoes slidably connected to the second guide rails for displacing the workpiece holder relative to the machine frame;

Wherein the housing is connected to the elongate tabletop; and

Wherein the outlet of the housing opens into the funnel-shaped receiving element.

Preferably, the grinding spindle support is adjustable with respect to a slant angle relative to the workpiece holder.

In another embodiment of the present invention, the grinding spindle support comprises glide shoes and the machine frame comprises a curved lateral guide slot. The glide shoes are slidably connected to the lateral guide slot. The grinding spindle support has a neck and the housing has an opening for receiving the neck. Between the neck and the rim of the opening sufficient play is provided to ensure adjustability of the slant angle and displacement of the elongate tabletop relative to the machine frame.

Preferably, the workpiece holder comprises a workpiece headstock with a first centering tip and a coaxially arranged auxiliary headstock with a second centering tip. The drive means comprises a linear drive connected to the workpiece headstock for linearly displacing the workpiece headstock. The workpiece headstock comprises a cylinder bore and a piston with a pull rod movably positioned in the cylinder bore. The pull rod engages the auxiliary headstock. The piston is loaded with a pressure medium for advancing the workpiece headstock and the auxiliary headstock toward one another in order to clamp a workpiece between the first and second centering tips.

Advantageously, the linear drive is comprised of an electric servomotor connected underneath the elongate tabletop at an upper end thereof. It further comprises an anti-friction spindle driven by the servomotor. A pull rod with a first and a second end is provided. A spindle nut is positioned on the anti-friction spindle and fixedly connected to the first end of the pull rod. The housing has an opening through which the second end of the pull rod extends into the housing. The second end of the pull rod is fixedly connected to the workpiece headstock.

Advantageously, four of the second glide shoes are connected to the workpiece headstock. Four of the second glide shoes are also connected to the auxiliary headstock and two of the second guide rails extend parallel to one another. The workpiece headstock and the auxiliary headstock are guided without play on the two parallel guide rails.

In another embodiment of the present invention, the workpiece headstock comprises a flange socket and a spindle sleeve slidably mounted in the flange socket. The spindle sleeve is biased by an adjustable spring force and displaceable against the adjustable spring force. The first centering tip is secured in the spindle sleeve. The flange socket has a neck. First roller bearings are mounted on the neck. A rotatable flange bushing with a follower pawl for the workpiece is mounted on the roller bearings. The rotatable flange bushing comprises a pulley. A drive shaft with a pulley extends parallel to the spindle sleeve. Second roller bearings for supporting the drive shaft are provided. A drive belt in the form of an endless steel band is placed onto the pulley of the drive shaft and the pulley of the rotatable flange bushing. A driven input shaft is rotationally fixedly and axially slidably coupled to the drive shaft and extends from the housing to the exterior of the housing.

Advantageously, the second roller bearings comprise bearing plates and a distance of the drive shaft to the flange bushing is changed by displacing the bearing plates.

Advantageously, the drive means includes an electric servomotor and a multi-stage belt drive for the input shaft. Also, a rotation pickup is coupled to the input shaft for determining the rotational angle of the input shaft independent of slip within the belt drive.

Preferably, the housing comprises a housing part enclosing the grinding wheel. The grinding machine further comprises a support plate connected to the housing part so as to be rotatable about a pivot axis perpendicular to the axis of the workpiece and arrestable in a selected position. The support plate has an opening through which the grinding wheel extends outwardly from the housing part. Guide means are connected to the support plate and a carriage with glide shoes that engage the guide means are provided so that the carriage is displaceable relative to the support plate in the axial direction of the workpiece. A driven wheel shaft is rotatably mounted on the carriage. A diamond trimming wheel is mounted on the wheel shaft. A servomotor is connected to the carriage. An anti-friction spindle driven by the servomotor is provided. A console mounted on the support plate has fixedly connected thereto a spindle nut that is positioned on the anti-friction spindle. The anti-friction spindle and the spindle nut cooperate to displace the carriage relative to the support plate in the axial direction of the workpiece.

According to the present invention, it is suggested that the grinding spindle, which is arranged on the grinding spindle support, is positioned with its axis such that it extends at a slant upwardly and that a housing is provided which encloses the workpiece holder and the grinding wheel and which extends at a slant in the axial direction of the grinding spindle. The housing is provided with an outlet opening for the cooling liquid at its lowermost point whereby the drive means for the linear movement of the workpiece holder as well as for the rotational movement of the grinding wheel and optionally of the workpiece is arranged exterior to the housing. Preferably, the slant of the workpiece holder and of the grinding spindle can be approximately 30° relative to the horizontal.

Due to the slanted arrangement of the grinding spindle and of the workpiece holder, the space requirement for the grinding machine is reduced by about ⅓ so that on a same given surface area it is possible to position a greater number of grinding machines. The slanted arrangement of the workpiece holder and of the grinding wheel within a housing enclosing them and having an outlet opening for the cooling liquid at the lowermost point has the effect that the cooling liquid flows off with a great velocity and the grinding dust has no opportunity to deposit and form crusts at the guide means of the workpiece holder. Cooling liquid cannot reach the drive means, which are arranged exterior to the housing, so that these drive means cannot be impaired by the presence of grinding dust within the cooling liquid.

Since the cooling liquid quickly flows out of the area of the workpiece holder, the workpiece holder can be arranged so as to be slidable with glide shoes and guide rails extending in the axial direction of the grinding spindle whereby an elongate tabletop is used. The elongate tabletop itself is displaceable on the machine frame with glide shoes on guide rails extending transverse to the axial direction of the grinding spindle. The housing, which encloses the workpiece holder and the grinding wheel, can be connected to the tabletop, and the outlet opening can open in the area of a funnel-shaped receptacle (receiving element) provided at the machine frame.

The spindle support can be arranged adjustably with respect to its slant relative to the workpiece holder by providing that the spindle support is supported with glide shoes on a curved guide slot located laterally at the machine frame and by providing enough play for its neck within the housing opening so that the angular adjustment of the spindle support and also the transverse movement of the elongate tabletop can be ensured to the required extent. With this arrangement it is possible that the housing part enclosing the workpiece holder and the housing part enclosing the grinding wheel are designed such that, despite the adjustability of the grinding spindle support, the grinding wheel is enclosed tightly over its entire circumference so that the rotating grinding wheel does not spin cooling liquid into the surroundings while the housing part for the workpiece holder can be open in the upward direction because in this area no splashing of cooling liquid must be taken into consideration.

The inventive grinding machine is especially suitable for peripheral round grinding, especially for grinding of thread rolling heads, thread gauges, and taps between centering tips, when the workpiece holder comprises a workpiece headstock connected to a linear drive and an auxiliary headstock coaxially arranged thereto and when the workpiece headstock and the auxiliary headstock can be advanced relative to one another with a length-adjustable pull rod with the aid of a piston guided within a cylinder bore of the workpiece headstock for clamping the workpiece with a hydraulic or pneumatic pressure medium.

The linear drive can advantageously comprise an electric servomotor arranged at the upper end to the underside of the elongate tabletop, an anti-friction spindle driven by the electric servomotor, and a spindle nut which is arranged on the anti-friction spindle and fixedly connected to a pull rod. The pull rod may extend through an opening in the housing to the workpiece holder and may be fixedly connected thereto. In order to provide for an extremely precise guiding of the workpiece headstock and of the auxiliary headstock in order to thus achieve a machining of the workpiece as precise as possible, the workpiece headstock and the auxiliary headstock can be guided with four glide shoes each on two parallel guide rails in a play-free manner.

In a further embodiment of the invention, the workpiece headstock can be provided with a flange socket receiving therein a spindle sleeve that is displaceable against an adjustable spring force for securing therein a centering tip. The workpiece headstock may further comprise a rotatable flange bushing positioned with roller bearings on a neck of the flange socket. The flange bushing has a follower pawl for the workpiece and an area which is designed as a belt pulley. Parallel to the spindle sleeve within the workpiece headstock a hollow drive shaft, which is supported on roller bearings, may be provided whereby an endless steel band used as a drive belt is placed over the pulley-shaped area provided at the drive shaft and the pulley-shaped area (belt pulley) of the flange bushing. A driven shaft extending to the exterior of the housing may be connected to the drive shaft so as to be rotationally fixed but axially displaceably coupled thereto.

In this manner, the workpiece can be rotated via the rotatable flange bushing with follower pawl and can also be axially displaced.

In order to be able to tension the steel band, the roller bearing and the drive shaft may be positioned in bearing plates the distance of which to the drive shaft can be changed.

The rotational drive for the shaft which drives the flange bushing can be achieved with an electric servomotor and a multi-stage belt drive that, despite the slip which cannot be avoided with a belt drive, ensures the rotation of the shaft with precise angular position by providing at this shaft a rotation pickup for determining the angular position of the shaft which then corrects the rotation of the servomotor while taking into consideration the slip within the belt drive.

Since during grinding of thread rolling heads, thread gauges and taps a frequent trimming of the grinding wheel is required in order to maintain the required precision during manufacture, it is possible to provide a support plate at the housing part for the grinding wheel which is rotatable about an axis perpendicular to the axis of the workpiece and arrestable in a selected position. An opening for the grinding wheel is provided at the support plate. A carriage is connected to the support plate with guide rails and glide shoes so as to be displaceable in the axial direction of the workpiece and has connected thereto a rotatably driven shaft for a diamond trimming wheel. To the carriage an electric servomotor is connected which drives an anti-friction spindle that effects with a spindle nut, fixedly connected to a console mounted on the support plate and engaged by the anti-friction spindle, the linear displacement of the carriage and thus of the diamond trimming wheel. Since in this manner the radial advancement of the diamond trimming wheel relative to the grinding wheel is achieved with the linear drive of the elongate tabletop, the trimming device thus only requires a linear drive and a rotational drive.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 10.

Figure 1:
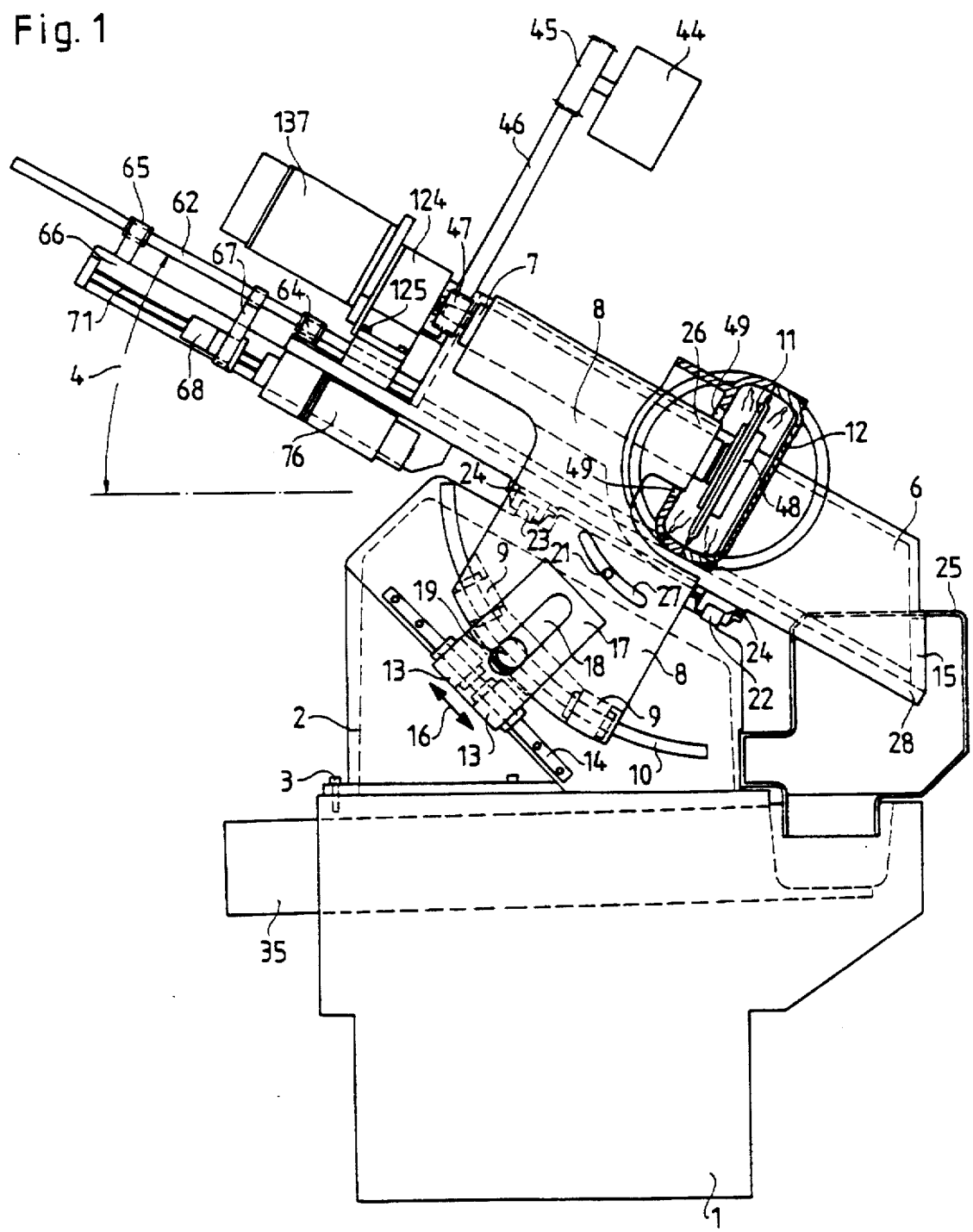
FIG. 1 shows a side view of the grinding machine, partly in section, in the plane of the grinding wheel spindle.
Figure 2:
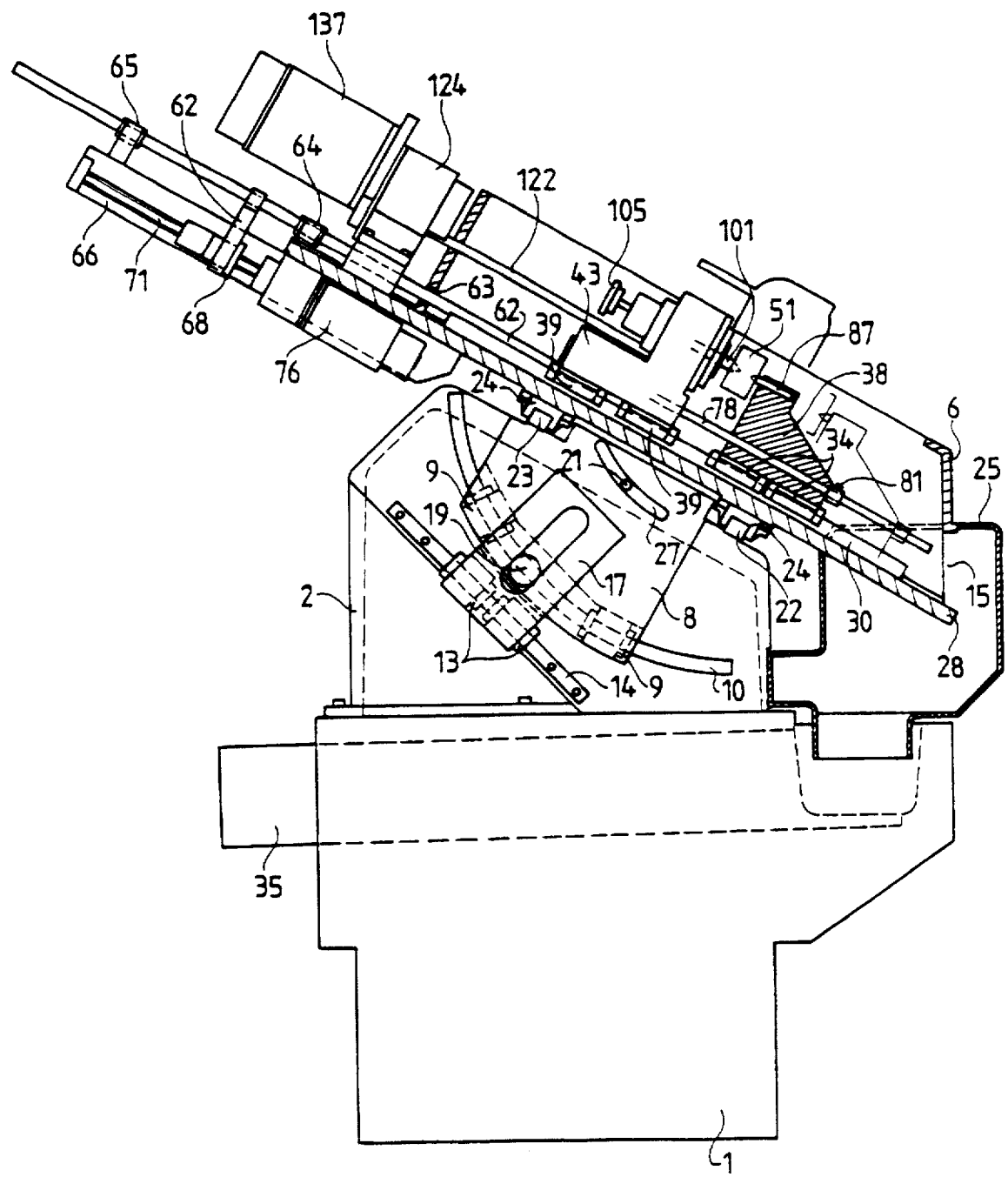
FIG. 2 shows a side view of the grinding machine, partly in section, in the plane of the workpiece holder.

In FIGS. 1 and 2 it can be seen that the grinding machine has a machine frame comprised of a base with a horizontal support surface 1 to which a machine stand 2 is connected with fastening screws 3. A grinding spindle support 8 is supported at the machine stand 2 so as to be adjustable with respect to its angular position. For this purpose, a guide slot 10 is provided at the machine stand 2 which is of a part-circular shape. The glide shoes 9 which are screwed to the grinding spindle support 8 are guided without play within the guide slot 10.

Within the grinding spindle support 8 a grinding spindle 7 is mounted which comprises at one end a pulley 47 which is rotated by a drive belt 46 and a further pulley 45 by the drive motor 44. At the other end of the grinding spindle 7 a grinding wheel 11 is arranged. The grinding spindle support 8 extends with its neck 26 through an opening 29 in the housing part 12 that encloses tightly the grinding wheel 11. The opening 49 is of such a size that the grinding wheel 11 can be adjusted by a certain angle in the manner indicated relative to the housing part 12 without the neck 26 contacting the rim of the opening at the housing part 12 and without the grinding wheel 11 contacting the housing part 12. The grinding wheel 11 is fastened with a flange 48 to the grinding spindle 7.

The adjustability of the slant angle of the grinding spindle support 8 is achieved by displacing linearly a plate 17, which is supported with glide shoes 13 on a guide rail 14, in the direction of arrow 16. A pin 19 which is connected to the grinding spindle support 8 penetrates a slotted hole 18 in the plate 17 and thus transmits the linear displacement of the plate 17 along the guide rail 14 onto the grinding spindle support 8 which thus is pivoted by a predetermined angle.

Figure 3:
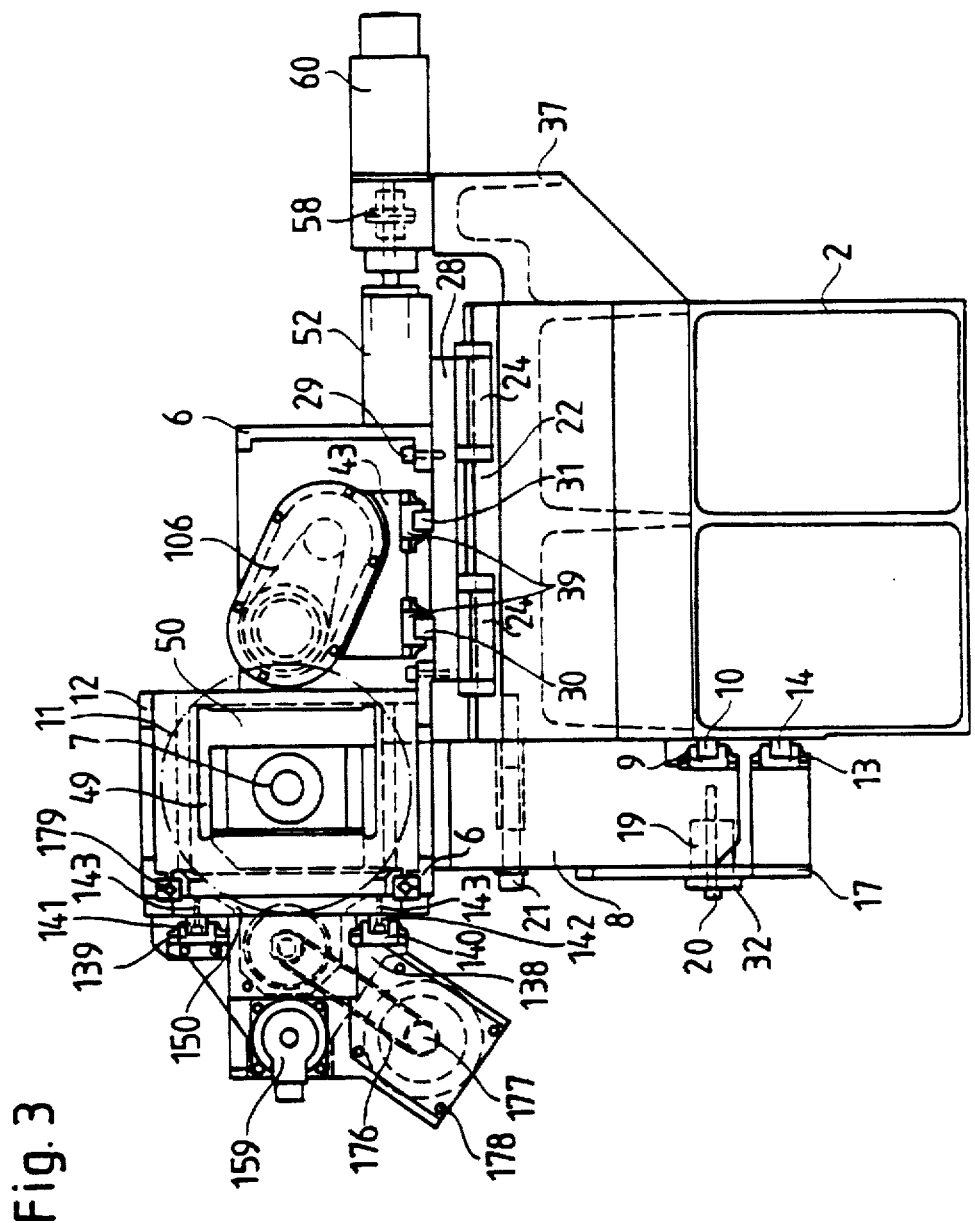
FIG. 3 shows a front view of the grinding machine.
Figure 4:
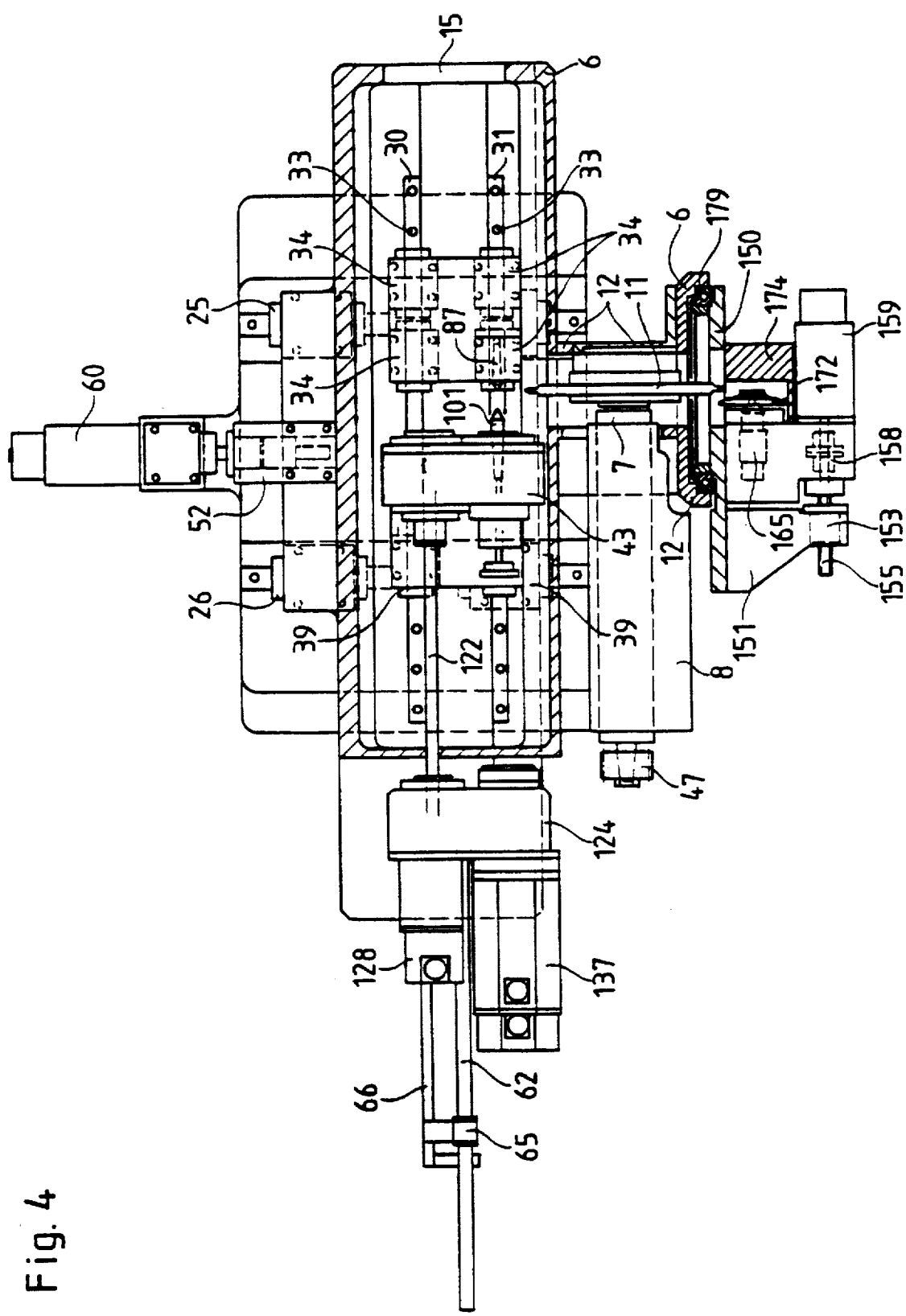
FIG. 4 shows a sectional plan view of the grinding machine in the plane of the workpiece holder.

FIG. 3 shows that a securing disc 32 having a diameter that is greater than the width of the slotted hole 18 is placed onto the pin 19. This securing disc 32 is secured with a screw 20 which is also the fastening screw for the pin 19.

A curved slotted hole 27 is concentrically arranged relative to the guide slot 10 within the grinding spindle support 8. A clamping screw 21 projects through the slotted hole 27. After adjustment of the angular position of the grinding spindle 7, the grinding spindle support 8 is secured by fastening the clamping screw 21 in this selected angular position.

On a surface of the machine stand 2, which relative to the horizontal is slanted in a downward direction by an angle 4 of approximately 30 degrees, parallel guide rail 22, 23 are provided. These guide rails 22, 23 guide without play an elongate tabletop 28 having glide shoes 24 fastened thereat in a direction transverse to the axis of the grinding spindle 7.

A housing part 6 is arranged on the elongate tabletop 28 and fastened thereto with screws 29. This housing part 6 encloses the workpiece holder, to be discussed in detail in the following, and communicates with an opening with the housing part 12 of the grinding wheel 11.

The housing part 6 and the housing part 12 serve to prevent splashing of the cooling medium which, in a manner not represented, is introduced into the area between the grinding wheel 11 and the workpiece 51 and removed together with the resulting grinding dust without allowing the grinding dust to settle. This is one of the reasons why the elongate tabletop 28 is arranged at an angle 4. At the lowest point of the housing part 6 an outlet opening 16 is provided via which the cooling liquid can reach a funnel-shaped receiving element 25 from where the cooling liquid can be guided via a drainage 35 into a non-represented filtering unit in order to be returned after filtering with a pump into the area of the grinding wheel 11 and the workpiece 51.

The elongate tabletop 28 is provided with parallel guide rails 30, 31 that are mounted with fastening screws 33. The headstock 38 with centering tip 87 is provided with glide shoes 34 which engage the guide rails 30, 31 in a play-free manner.

The work piece headstock 43 is also provided with glide shoes 39 in order to be displaceable in a play-free manner on the guide rails 30, 31. It has a centering tip 101 which extends coaxially to the centering tip 87.

The work piece headstock 43 will be explained in detail with reference to FIGS. 5 and 6.

To the console 37 of the machine stand 2 an electric servomotor 60 is fastened which drives via a coupling 61 arranged in a housing 58 an anti-friction spindle 50. The housing 58 is connected with screws 59 to the console 37 and supports a bearing housing 56 that is connected with screws 57 to the housing 58. A housing 52 is screwed onto the elongate tabletop 28. A spindle nut 53 is connected with screws 54 to the housing 52. By rotating the anti-friction spindle 55 with the servomotor 60 a linear displacement of the elongate tabletop 28 along the guide rail 22, 23 is effected. Due this linear displacement the advancement of the work piece 51 toward the grinding wheel 11 is achieved.

A pull rod 62 is fixedly connected to the workpiece headstock 53 and extends through an opening 63 of the upper portion of the housing part 6 to the exterior. The guide bushings 64, 65 provided at the elongate tabletop 28 and at a console 66 screwed to the elongate tabletop 28 ensure a precise guiding of the pull rod 62 without the risk of canting.

Figure 8:
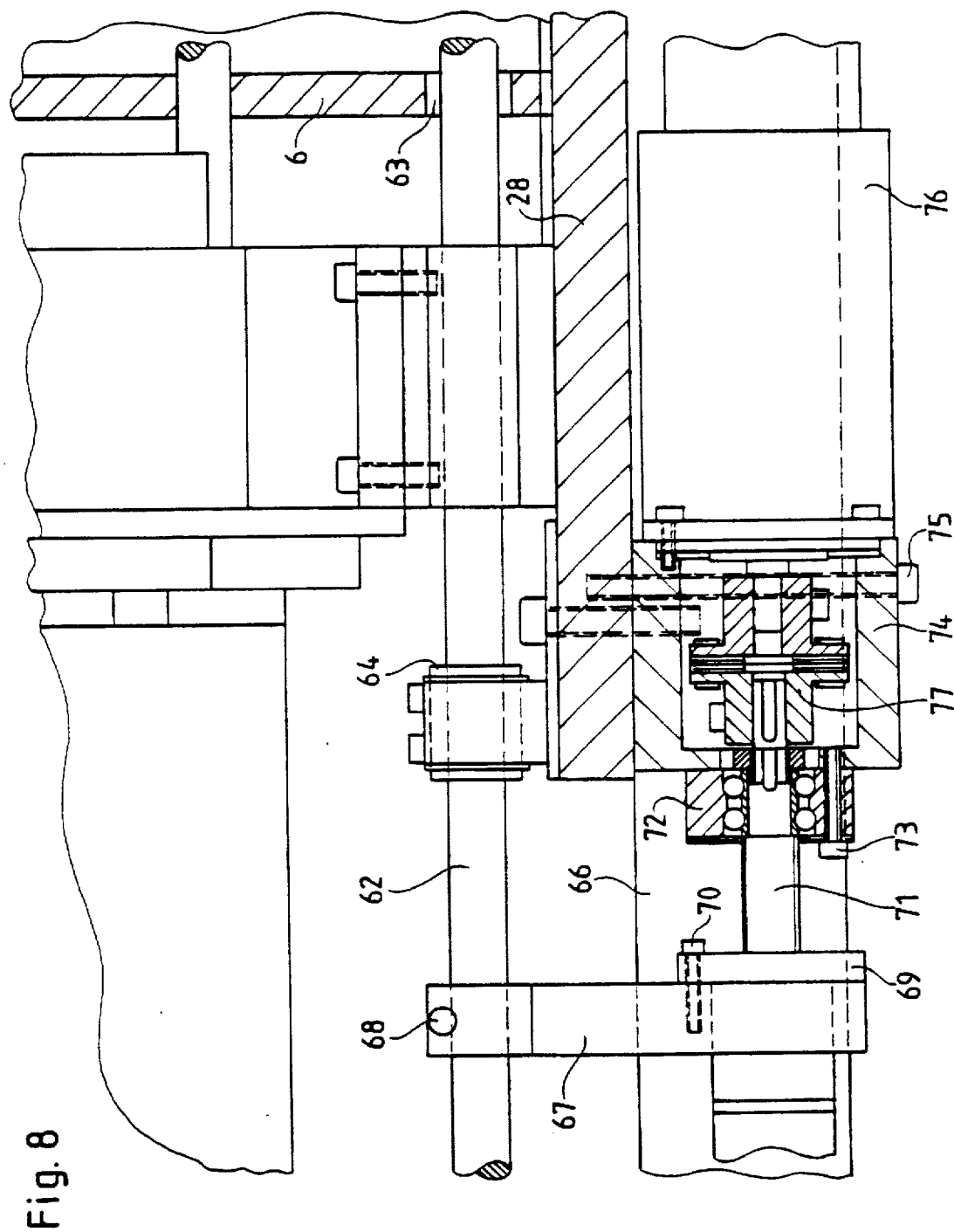
FIG. 8 shows a representation, partly in section, of the linear drive of the workpiece holder.
Figure 9:
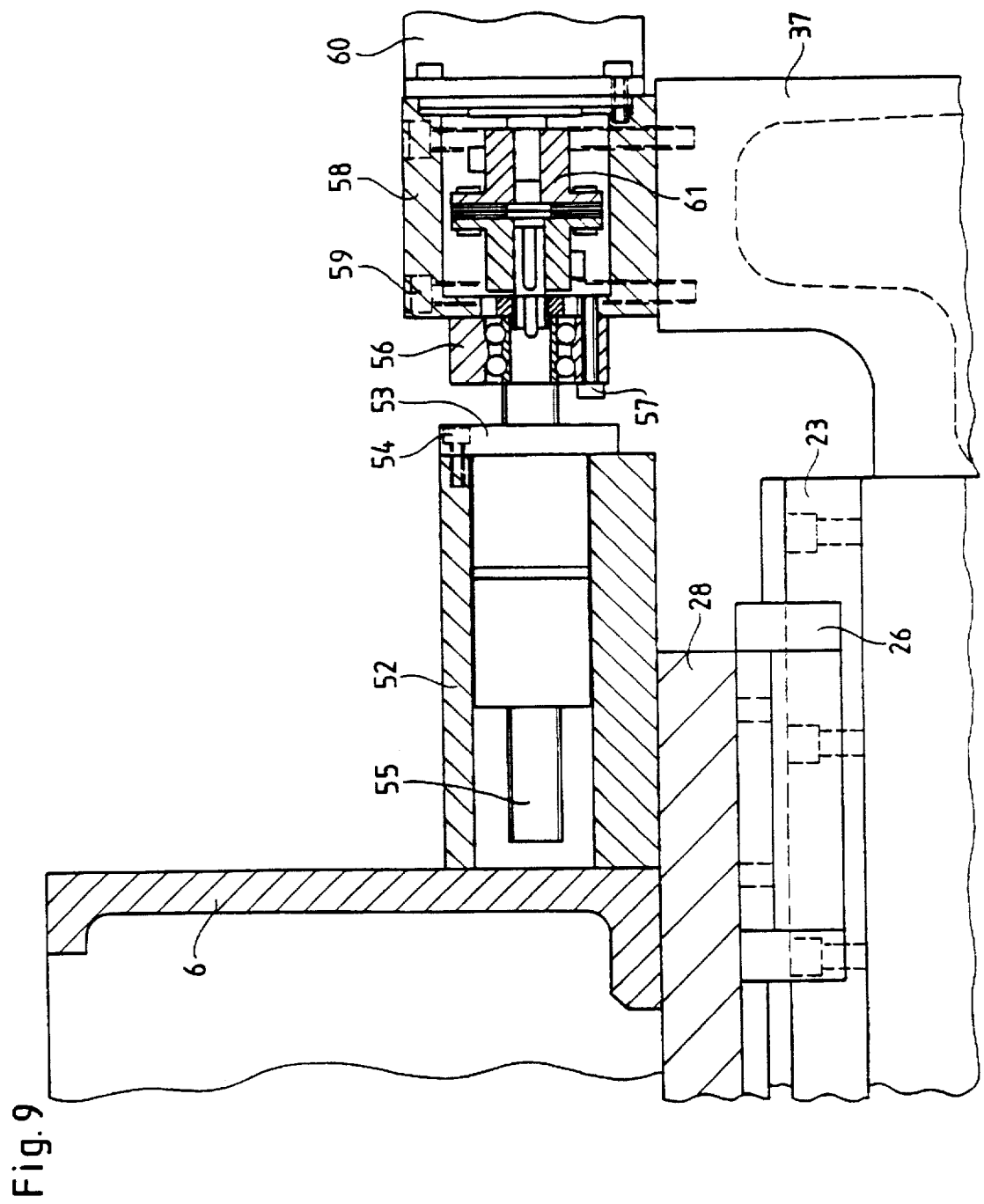
FIG. 9 shows a sectional view of the linear drive of the elongate tabletop.

FIG. 8 shows details of the linear drive for the workpiece headstock 43 and the auxiliary headstock 38. An arm 67 is non-displaceably connected with the pull rod 62 by a clamping screw 68 and serves as a support for a spindle nut 69 arranged axis-parallel to the pull rod 62. The spindle nut 69 is fixedly connected with screws 70 to the arm 67.

The anti-friction spindle 71 cooperates with the spindle nut 69 and effects an axial displacement when the spindle 71 is rotated. The anti-friction spindle 71 is guided with a bearing 72 that is connected with screws 73 to the housing 74. This housing 74 is, in turn, connected with screws 75 to the elongate tabletop 28 and serves as a support for an electric servomotor 76 which is arranged in a protected manner below the elongate tabletop 28. The servomotor 76 is connected with a clutch 77 to the anti-friction spindle 71.

Figure 5:
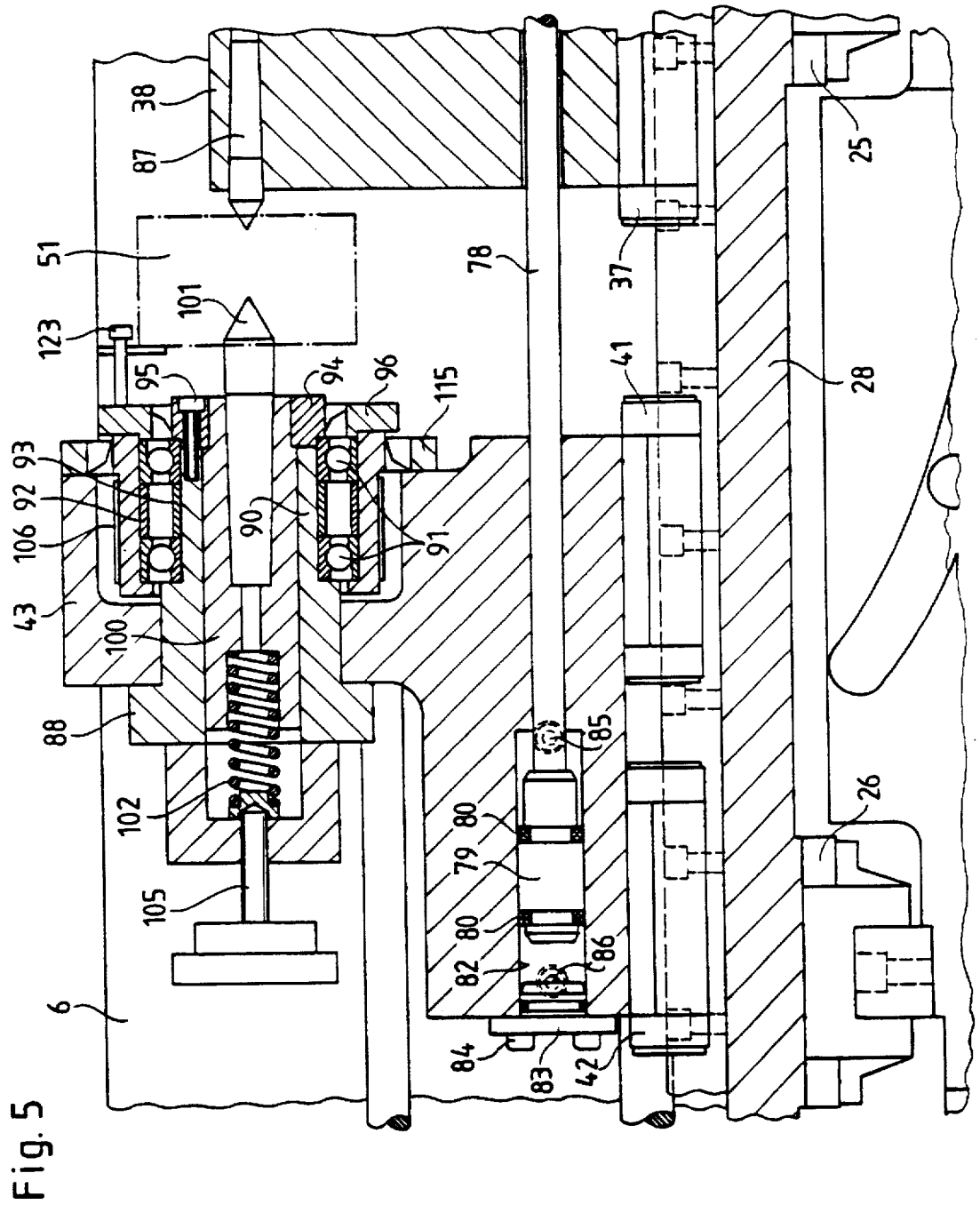
FIG. 5 shows an enlarged sectional view of the workpiece holder.
Figure 6:
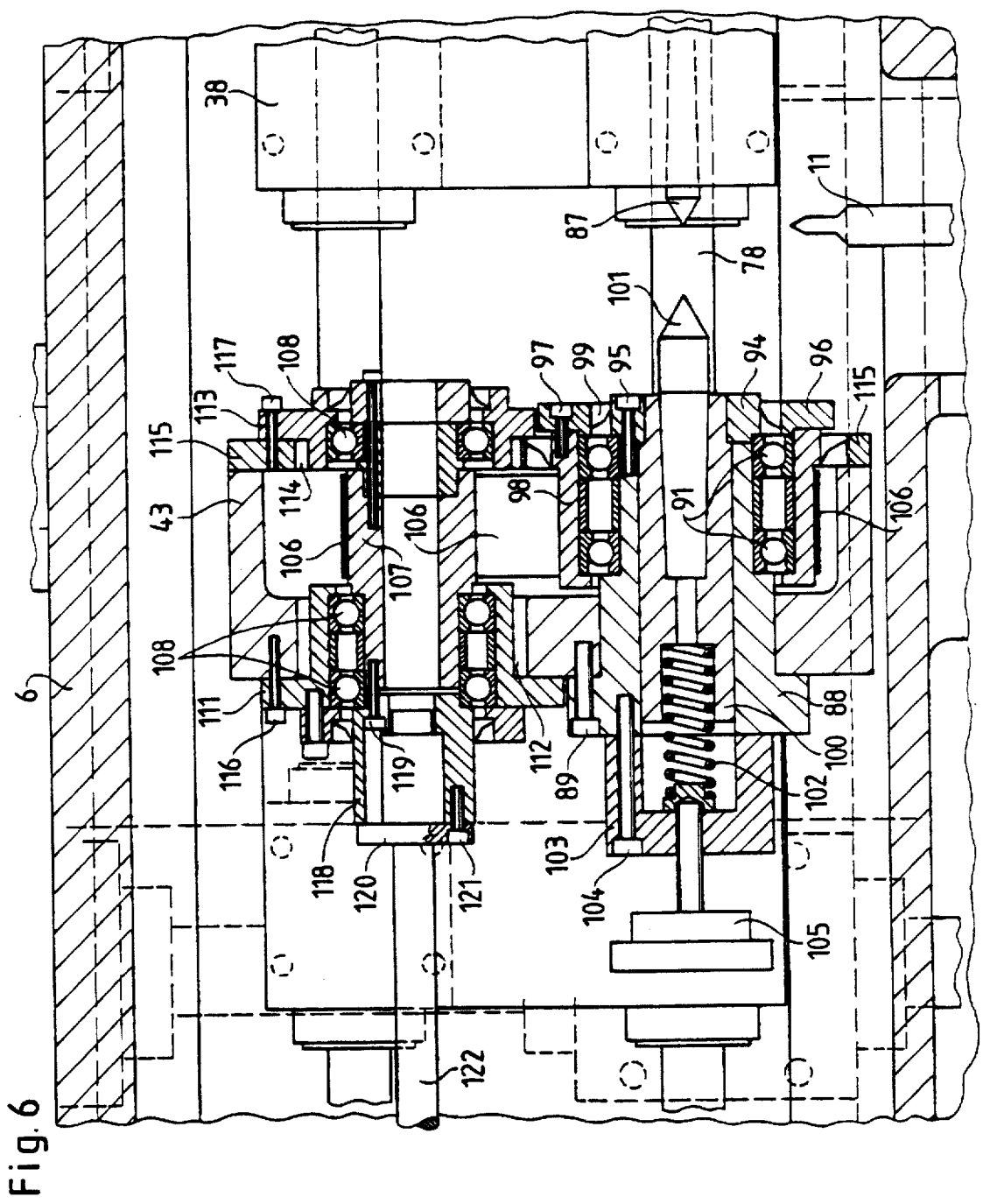
FIG. 6 shows a sectional view of the workpiece holder of FIG. 5 in a plan view.

As can be seen in detail in FIGS. 2, 5, and 6, a pull rod 78 extends between the auxiliary headstock 38 and the workpiece headstock 33 which is guided in coaxial bores within the auxiliary headstock 38 and the workpiece headstock 43. At the side of the auxiliary headstock 38 facing away from the workpiece headstock 43 a clamping ring 81 is provided with which the distance between the auxiliary headstock 38 and the workpiece headstock 43 can be adjusted within wide limits according to the length of the workpiece 51. In the bores of the workpiece headstock 43 the pull rod 78 is guided in a sealed manner and carries at its end a piston 79 having a greater diameter. The piston 79 is guided with sealing rings 80 in a cylinder bore 82. The cylinder bore 82 is tightly closed off by a lid 83 which is clamped against the workpiece headstock 43 by screws 84. The cylinder bore 82 can be supplied with a pressure medium on both sides of the piston 79 via connectors 85, 86. When the connector 85 is loaded with pressure medium, the pull rod 78 pulls the auxiliary headstock 38 in the direction toward the workpiece headstock 43 and clamps the workpiece 51 between the centering tips 87, 101. When the connector 86 is loaded with pressure medium, the clamping of the auxiliary headstock 38 against the workpiece headstock 43 is relieved and the workpiece 51 can be removed from the centering tips 87, 101.

A flange socket 88 is arranged within the workpiece headstock 43 which is fastened with screws 89 at the workpiece headstock 43. A neck 90 of the flange socket 88 receives a pair of spaced apart precision roller bearings 90 having arranged between their bearing rings spacer bushings 92, 93. A clamping ring 94 which is fastened with screws 95 to the flange bushing 88 secures the inner rings onto the neck 90 of the flange socket 88. The outer rings of the precision roller bearings 91 support a bushing 98 which is embodied as a pulley. A drive ring 96 is connected with screws 97 to the bushing 98 so that the exterior rings of the precision roller bearing 91 are clamped via the spacer bushings 92 relative to one another. A sealing of the precision roller bearings 91 is provided by a seal 99 arranged between the drive ring 69 and the clamping ring 94.

A spindle sleeve 100 is displaceably supported within the flange socket 88. The spindle sleeve 100 is loaded axially by a pressure spring 102 which can be adjusted with respect to its pretension with a clamping screw 105 having a turn knob. The clamping ring 94 prevents that the spindle sleeve 100 can be forced out of the flange socket 88 by the pressure spring 102. The clamping screw 105 is guided with a thread in the housing 103 that is fastened with screws 104 to the flange bushing 88.

An endless steel band 106 is placed about the pulley formed at the bushing 98 and also about the pulley formed at the parallel shaft 107 and transmits the rotation of the shaft 107 onto the bushing 98.

The shaft 107 is supported with roller bearings 108, 109, 110 in bearing plates 111, 113. The workpiece headstock 43 comprises an opening 112 for the bearing plate 111 and an opening 114 for the bearing plate 113. Both openings are of such a size that a parallel displacement of the bearing plates 111, 113 relative to the bushing 98 is possible. Due to this parallel displacement the steel band 106 is tensioned so that the bearing plates 111, 113 can subsequently be clamped with screws 116, 117 relative to the workpiece headstock 43. The bearing plate 113 is arranged within a cover plate 115 which closes off the workpiece headstock 43 relative to the auxiliary headstock 38.

A socket 118 is screwed with screws 119 to the shaft 107. At its end face a follower disc 120 with an inner key profile is mounted with screws 121. A shaft 122 engages with an outer key profile the follower disc 120 so that the shaft 107 is rotated by the shaft 122. This results in an axial displacement of the workpiece headstock 43 and of the auxiliary headstock 38 relative to the shaft 122.

By rotating the shaft 107, the bushing 98 is also rotated with the aid of the steel band 106 and thus rotates, with the aid of a follower pawl 123 connected to the drive ring 96, the workpiece 51.

Figure 7:
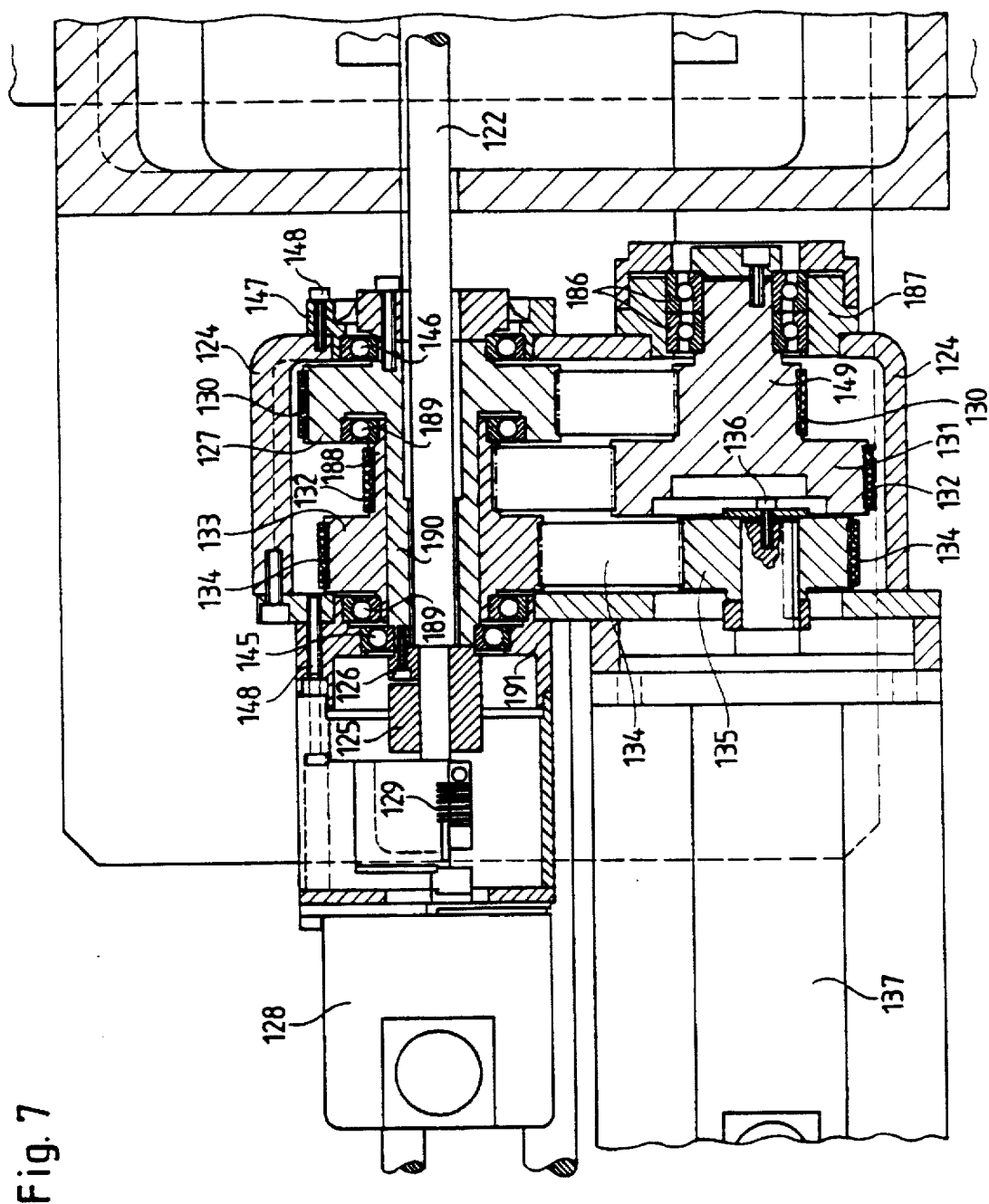
FIG. 7 shows a sectional view of the belt drive for the linear drive of the workpiece holder.

The rotational drive for the shaft 122 is comprised of a multi-stage belt drive which will be explained in detail with the aid of FIG. 7.

A pulley 127 with a shaft connected thereto is arranged with roller bearing 145, 166 in a housing 124. The roller bearings 145, 146 are arranged in bearing plates 146, 147 connected with screws 148 to the housing 124. To the shaft 122 a clamping ring 125 is connected with screws 126 and provides a fixed connection between the shaft 122 and the shaft of the pulley 127. In extension of the clamping ring 125 a rotation pickup 128 is arranged which is rotationally fixedly connected with the clamping ring 125 by a clutch 129. This rotation pickup 128 detects the angular position of the shaft 122 and transmits it to a control unit of the grinding machine.

A belt 130 is placed onto the pulley 127 which also engages a pulley 149 of a smaller diameter which is arranged parallel to the axis of the pulley 107. With the pulley 149 a further pulley 131 is connected. Both pulleys 131, 149 are supported with a roller bearing pair 186 arranged within a bearing plate 187 within the housing 124.

A pulley pair 133, 188 of different diameters is arranged concentrically to the shaft 119 of the pulley 127. The pulley pair 133, 188 is supported with roller bearings 189 in the pulley 127 and the bearing plate 191. A belt 132 is placed onto the pulley 131, 188 while a belt 134 is placed onto the pulley 133. Belt 134 engages a pulley 135 at the electric servomotor 137. The pulley 135 is fastened with a screw 136 to the drive shaft of the electric servomotor 137.

In this manner a multi-stage belt drive is provided with which the shaft 122 can be driven in a smooth continuous manner and, despite the unavoidable slip in such a belt drive, a highly precise angular positioning of the shaft 122 can be provided because the rotation pickup 128 is directly coupled to the shaft 122.

Figure 10:
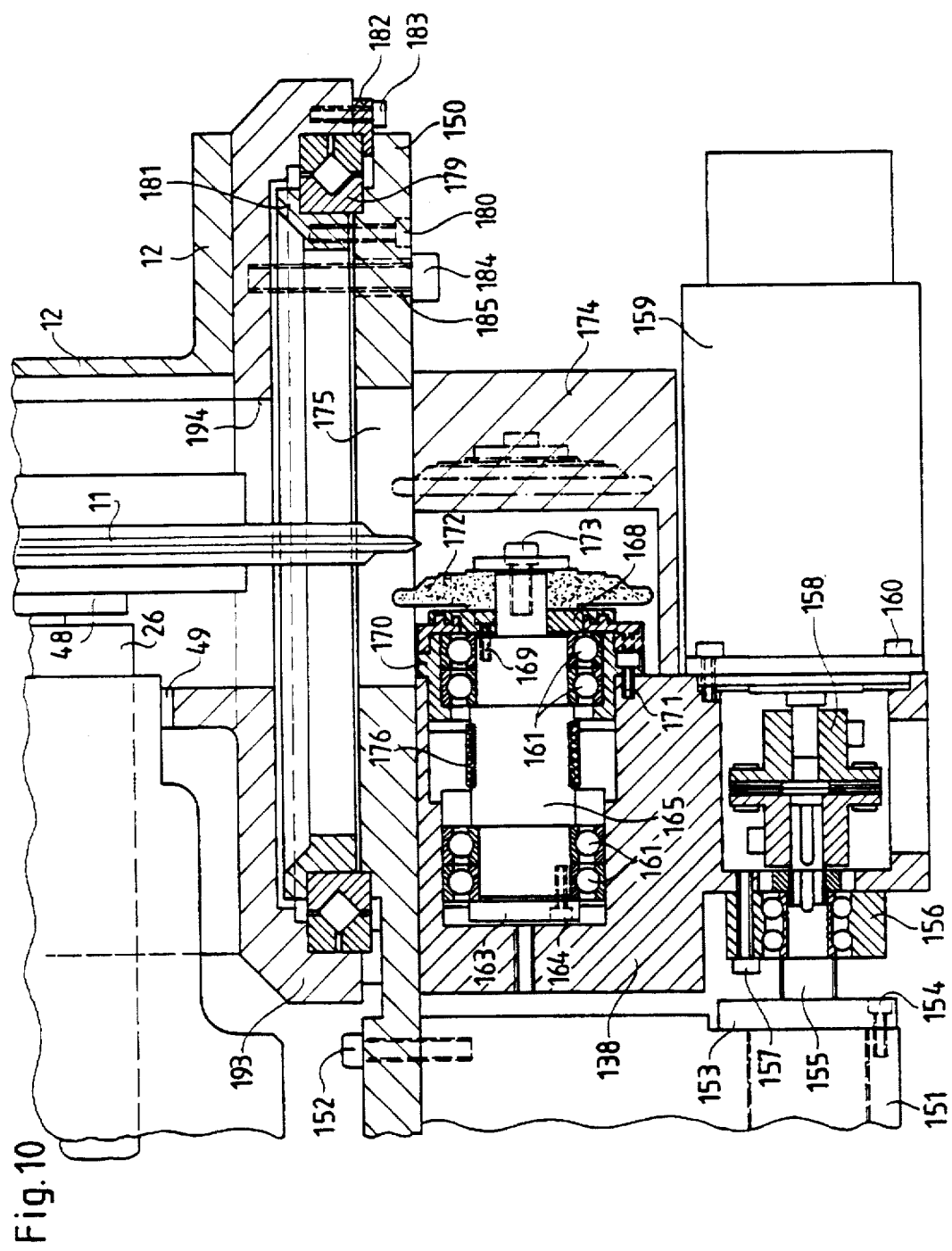
FIG. 10 shows a sectional view of the trimming device with its drives.

With the aid of FIG. 10 a trimming device will be described that can be adjusted angularly relative to the grinding wheel 11 and requires only one linear drive for the trimming operation.

When it is desired to produce highly precise thread rolling heads, taps, respectively, especially thread gauges, it is necessary to maintain the grinding wheel in such a state that the prescribed thread profiles can be exactly ground with the grinding wheel 11.

Since the angle of the grinding wheel 11 relative to the axis of the workpiece must be adjusted according to the pitch of the thread to be ground by adjusting the grinding spindle support 8 and since the trimming operation, especially during grinding of thread gauges during the manufacture of thread gauges must be repeated frequently, it is thus necessary that the trimming device be also adjusted to the identical angle as the grinding wheel 11. This is achieved by arranging a circular plate 193 at the flange-like widened portion 192 of the housing part 12 that encloses the grinding wheel which plate 193 has a central elongate opening for the grinding wheel. This circular plate 193 supports an axial roller bearing 179 of a large diameter the outer ring of which is connected with screws 183 and a clamping ring 182 to the plate 193. A support plate 150 is connected with screws to the inner ring of the roller bearing by clamping a clamping ring 181 with the aid of screws 180 against the opposite side of the inner ring of the roller bearing 179. The support plate 150 also has an opening 175 for allowing penetration of the grinding wheel 11. To the support plate 150 a console 151 is connected with screws 152. To this console 151 a spindle nut 153 is fixedly connected with screw 154 so as to be non-rotatable and non-slidable. The spindle nut 153 is engaged by an anti-friction spindle 155 which is fastened with bearing 156 to a carriage 138. To the carriage 138 an electric servo motor 159 is fastened which drives via clutch 158 the anti-friction spindle 155. In a bore of the carriage 138 the trimming spindle 165 is supported with precision roller bearings 161. At one end of the trimming shaft 165 the roller bearings 161 are secured with a disc 163 and screws 164 while, at the other end of the trimming spindle 165, this task is performed by a labyrinth sealing ring 168 which is fastened with screws 169 to the trimming spindle 165. The roller bearing 161 which are arranged adjacent to the diamond trimming wheel 172 are connected via bearing housing 170 and screws 171 to the carriage 138. The diamond trimming wheel 172 is connected with a central screw 173 to the trimming spindle 165. A cover 174 is placed onto the carriage 138 which closes the opening 175 in the support plate 150 in any position of the carriage 138 so that no cooling liquid, no grinding dust, and no trimming dust can pass through the opening 175 to the exterior. The area between the bearings 161 of the trimming spindle 165 is in the form of a pulley engaged by a belt 176. As can be seen in FIG. 3, the belt 176 is guided to an electric motor 178 with pulley 177 so that the diamond trimming wheel 172 can be rotated. The electric motor 178 is fastened below the carriage 138.

In order to trim the grinding wheel 11, the diamond trimming wheel 172 is first positioned parallel to the grinding wheel 11 by loosening the clamping screw 148 and rotating the support plate 150 by the required angle. The clamping screw 184 penetrates a slotted hole 185 in the support plate 150 so that a sufficient range for angular adjustment is provided. After adjustment of the angle, the clamping screw 184 is tightened and the carriage 138 is displaced with the servomotor 159 in order to bring the diamond trimming wheel 170 into engagement with the grinding wheel 11. By displacing the carriage 138 an axial advancement of the diamond trimming wheel 172 is achieved. By displacing the longitudinal tabletop 28 with the servomotor 60 a radial advancement is provided. Thus, only one drive at the carriage 138 is required for the trimming device in order to displace the diamond trimming disk 172 in the axial direction. For the radial advancement of the diamond trimming wheel 172 relative to the grinding wheel 11, the drive of the elongate tabletop 28 can be used.

The drives for the diamond trimming wheel 172 and the carriage 138 are positioned exterior to the housing parts 6, 12 and are thus not exposed to cooling liquid, grinding dust or trimming dust.

The present invention is, of course, in no way restricted to the specific disclosure of the specification and drawings, but also encompasses any modifications within the scope of the appended claims.

What I claim is:

1. A grinding machine comprising:
    a machine frame having a horizontal support surface;
    a grinding spindle support positioned on said horizontal support surface of said machine frame;
    at least one grinding spindle having an axis arranged downwardly slanted relative to said horizontal support surface at said grinding spindle support;
    a grinding wheel connected to said grinding spindle;
    a workpiece holder connected to said machine frame so as to extend parallel to the axis of said grinding spindle;
    said workpiece holder displaceable in the axial direction of said grinding spindle and perpendicular to the axial direction of said grinding spindle;
    a housing positioned at a slant parallel to the axis of said grinding spindle and enclosing said workpiece holder and said grinding wheel;
    said housing having an outlet opening for a cooling liquid at a lowermost point of said housing;
    drive means, for effecting a linear movement of said workpiece holder and a rotational movement of said grinding wheel and the workpiece, positioned exterior to said housing.

2. A grinding machine according to claim 1, wherein said workpiece holder is positioned at a slant angle of approximately 30° relative to said horizontal support surface.

3. A grinding machine according to claim 1, further comprising:
- an elongate tabletop comprising first guide rails, extending perpendicular to the axial direction of said grinding spindle and connected to said machine frame, and first glide shoes slidably connected to said guide rails for displacing said elongate tabletop relative to said machine frame;
- a funnel-shaped receiving element for catching the cooling liquid connected to said machine frame;
- wherein said workpiece holder comprises second guide rails extending in the axial direction of said grinding spindle and second glide shoes slidably connected to said second guide rails for displacing said workpiece holder relative to said machine frame;
- wherein said housing is connected to said elongate table top; and
- wherein said outlet opening of said housing opens into said funnel-shaped receiving element.

4. A grinding machine according to claim 3, wherein said grinding spindle support is adjustable with respect to a slant angle relative to said workpiece holder.

5. A grinding machine according to claim 4, wherein:
said grinding spindle support comprises glide shoes;
said machine frame comprises a curved lateral guide slot;
said glide shoes are slidably connected to said lateral guide slot;
said grinding spindle support has a neck;
said housing has an opening for receiving said neck; and
between said neck and a rim of said opening sufficient play is provided to ensure adjustability of said slant angle and displacement of said elongate tabletop relative to said machine frame.

6. A grinding machine according to claim 3, wherein said workpiece holder comprises a workpiece headstock with a first centering tip and a coaxially arranged auxiliary headstock with a second centering tip, wherein said drive means comprises a linear drive connected to said workpiece headstock for linearly displacing said workpiece headstock, wherein said workpiece headstock comprises a cylinder bore and a piston with a pull rod movably positioned in said cylinder bore, said pull rod engaging said auxiliary headstock, wherein said piston is loaded with a pressure medium for advancing said workpiece headstock and said auxiliary headstock toward one another in order to clamp a workpiece between said first and second centering tips.

7. A grinding machine according to claim 6, wherein said linear drive is comprised of:
- an electric servo motor connected underneath said elongate table top at an upper end thereof;
- an anti-friction spindle driven by said servomotor;
- a pull rod with a first and a second end;
- a spindle nut positioned on said anti-friction spindle and fixedly connected to said first end of said pull rod;
- said housing having an opening through which said second end of said pull rod extends into said housing;
- said second end of said pull rod fixedly connected to said workpiece headstock.

8. A grinding machine according to claim 6, wherein:
four of said second glide shoes are connected to said workpiece headstock;
four of said second glide shoes are connected to said auxiliary headstock;
two of said second guide rails extend parallel to one another; and
said workpiece headstock and said auxiliary headstock are guided without play on said two parallel guide rails.

9. A grinding machine according to claim 6, wherein:
said workpiece headstock comprises a flange socket and a spindle sleeve slidably mounted in said flange socket;
said spindle sleeve being biased by an adjustable spring force and displaceable against the adjustable spring force;
said first centering tip secured in said spindle sleeve;
said flange socket having a neck;
first roller bearings mounted on said neck;
a rotatable flange bushing with a follower pawl for the workpiece mounted on said roller bearings;
said rotatable flange bushing comprising a pulley;
a drive shaft with a pulley extending parallel to said spindle sleeve;
second roller bearings for supporting said drive shaft;
a drive belt in the form of an endless steel band placed onto said pulley of said drive shaft and said pulley of said rotatable flange bushing;
a driven input shaft rotationally fixedly and axially slidably coupled to said drive shaft and extending from said housing to the exterior of said housing.

10. A grinding machine according to claim 9, wherein said second roller bearings comprise bearing plates and wherein a distance of said drive shaft to said flange bushing is changed by displacing said bearing plates for tensioning said steel band.

11. A grinding machine according to claim 9, wherein said drive means includes an electric servomotor and a multistage belt drive for said input shaft, and further a rotation pickup coupled to said input shaft for determining a rotational angle of said input shaft independent of slip within said belt drive.

12. A grinding machine according to claim 1, wherein said housing comprises a housing part enclosing said grinding wheel, said grinding machine further comprising:
- a support plate connected to said housing part so as to be rotatable about a pivot axis perpendicular to the axis of the workpiece and arrestable in a selected position, said support plate having an opening through which said grinding wheel extends outwardly from said housing part;
- guide means connected to said support plate;
- a carriage having glide shoes;
- said glide shoes engaging said guide means so that said carriage is displaceable relative to said support plate in an axial direction of the workpiece;
- a driven wheel shaft rotatably mounted on said carriage;
- a diamond trimming wheel mounted on said wheel shaft;
- a servomotor connected to said carriage;
- an anti-friction spindle driven by said servomotor;
- a console mounted on said support plate;
- a spindle nut fixedly connected to said console and positioned on said anti-friction spindle, wherein said anti-friction spindle and said spindle nut cooperate to displace said carriage relative to said support plate in the axial direction of the workpiece.

* * * * *